United States Patent
Emmanuel et al.

(10) Patent No.: US 10,862,575 B2
(45) Date of Patent: Dec. 8, 2020

(54) COMPACT PASSIVE REPEATER

(71) Applicant: NETGEAR, INC., San Jose, CA (US)

(72) Inventors: Joseph Amalan Arul Emmanuel, Cupertino, CA (US); Paul Nysen, San Jose, CA (US)

(73) Assignee: NETGEAR, INC., San Jose, CA (US)

(*) Notice: Subject to any disclaimer, the term of this patent is extended or adjusted under 35 U.S.C. 154(b) by 150 days.

(21) Appl. No.: 15/421,948

(22) Filed: Feb. 1, 2017

(65) Prior Publication Data

US 2017/0256861 A1    Sep. 7, 2017

Related U.S. Application Data

(60) Provisional application No. 62/304,052, filed on Mar. 4, 2016.

(51) Int. Cl.
*H01Q 19/30* (2006.01)
*H04B 7/15* (2006.01)
*H04B 7/145* (2006.01)

(52) U.S. Cl.
CPC ............... *H04B 7/15* (2013.01); *H04B 7/145* (2013.01)

(58) Field of Classification Search
CPC ......... H04B 7/15; H04B 7/145; H04W 52/52; H04W 52/143; H04W 16/26; H01Q 19/30; H01Q 1/2291; H01Q 21/28
See application file for complete search history.

(56) References Cited

U.S. PATENT DOCUMENTS

| | | | | |
|---|---|---|---|---|
| 2004/0110469 A1* | 6/2004 | Judd | ................. | G01S 19/25 455/15 |
| 2004/0166802 A1* | 8/2004 | McKay, Sr. | ........ | H04B 7/15535 455/15 |
| 2007/0205946 A1* | 9/2007 | Buris | ................... | H01Q 21/007 343/700 MS |
| 2014/0198008 A1* | 7/2014 | Walker | ................... | H01Q 9/16 343/833 |
| 2014/0349630 A1* | 11/2014 | Hyde | ..................... | H04B 7/026 455/418 |
| 2015/0200452 A1* | 7/2015 | Oh | ........................ | H01Q 15/02 343/754 |
| 2017/0018856 A1* | 1/2017 | Henry | .................. | H01Q 9/0485 |
| 2017/0099094 A1* | 4/2017 | Gluck | .................. | H04B 1/3822 |

FOREIGN PATENT DOCUMENTS

| | | |
|---|---|---|
| CN | 101218762 A | 7/2008 |
| CN | 101427486 A | 5/2009 |
| CN | 103795454 A | 5/2014 |
| JP | H0884106 A | 3/1996 |

\* cited by examiner

*Primary Examiner* — Dameon E Levi
*Assistant Examiner* — David E Lotter
(74) *Attorney, Agent, or Firm* — Perkins Coie LLP (57) ABSTRACT

An embodiment of the invention provides a transmissive passive repeater having two or more antenna arrays, each array comprised of a plurality of antenna elements. Each antenna array has an associated region. An aperture is defined by the antenna arrays with which energy at respective antenna arrays passes between each of the regions. Another embodiment of the invention provides a reflective passive repeater having an aperture. Energy received at the aperture is reflected back from the aperture. The aperture is configured to provide a conformal mapping between two regions as determined by complex coupling by individual antenna elements.

14 Claims, 14 Drawing Sheets

Fig. 14

COMPACT PASSIVE REPEATER

CROSS REFERENCE TO RELATED APPLICATIONS

This application claims priority to provisional patent application Ser. No. 62/304,052, filed Mar. 4, 2016, which application is incorporated herein in its entirety by this reference thereto.

FIELD

The invention relates to communications systems. More particularly, the invention relates to a compact passive repeater.

BACKGROUND

A wireless repeater takes an existing signal from a wireless router or wireless access point and rebroadcasts it to create a second network. When two or more hosts have to be connected with one another over the IEEE 802.11 protocol and the distance is too long for a direct connection to be established, a wireless repeater is used to bridge the gap. Those outside of the primary network are able to connect through the new repeated network. Wireless repeaters are commonly used to improve signal range and strength within homes and small offices. However, such devices require a constant source of power and are often bulky, unsightly, and therefore difficult to position unobtrusively within homes and small offices.

A passive repeater or passive radio link deflection, is a reflective or sometimes refractive panel or other object that assists in closing a radio or microwave link, in places where an obstacle in the signal path blocks any direct, line of sight communication. Compared to a microwave radio relay station with active components, a passive repeater is far simpler and needs little maintenance and no on-site electric power. It also does not require additional frequencies, unlike active repeater stations which use different transmit and receive frequencies to prevent feedback. The corresponding disadvantage is that without amplification the returned signal is significantly weaker.

Passive radio relay link deflection systems in the vertical level can be realized by receiving the signal with a parabolic antenna and leading it through a waveguide to a second parabolic antenna, where it is radiated. For passive microwave radio relay link deflections in the horizontal plane, flat surfaces of metallic material are used, arranged so that the angle of incoming beam corresponds to the angle of the outgoing signal. The resulting structure resembles a billboard.

Similar systems are used also occasionally for TV relay transmitters or as tunnel transmitters. In these cases, a Yagi antenna receives the transmitted signal and supplies it by way of a coaxial cable to a second Yagi antenna.

All such passive systems are quite large, typically the size of a billboard and, as such, are not suited for use in homes and small offices.

SUMMARY

An embodiment of the invention provides a transmissive passive repeater having two or more antenna arrays. Each antenna array has an associated region. An aperture is defined by the antenna arrays with which energy at respective antenna arrays passes between each of the regions.

Another embodiment of the invention provides a reflective passive repeater having an aperture. Energy received at the aperture is reflected back from the aperture. The aperture is configured to provide a conformal mapping between two regions as determined by complex coupling by individual antenna elements.

DESCRIPTION

An embodiment of the invention provides a transmissive passive repeater having two or more antenna arrays. Each antenna array has an associated region. An aperture is defined by the antenna arrays with which energy at respective antenna arrays passes between each of the regions.

Another embodiment of the invention provides a reflective passive repeater having an aperture. Energy received at the aperture is reflected back from the aperture. The aperture is configured to provide a conformal mapping between two regions as determined by complex coupling by individual antenna elements.

For Wi-Fi applications, the following definitions apply:
   Access Point (AP) Application
   Router (AP+Routing function)
   AP (standalone AP)
   Gateway (AP+Modem-DSL/VDSL/Cable/Fiber)
   Station (STA) Application
   STA (Wi-Fi Station)

Mobile Clients (MC)

Laptop Clients (LC)

Figure 1:
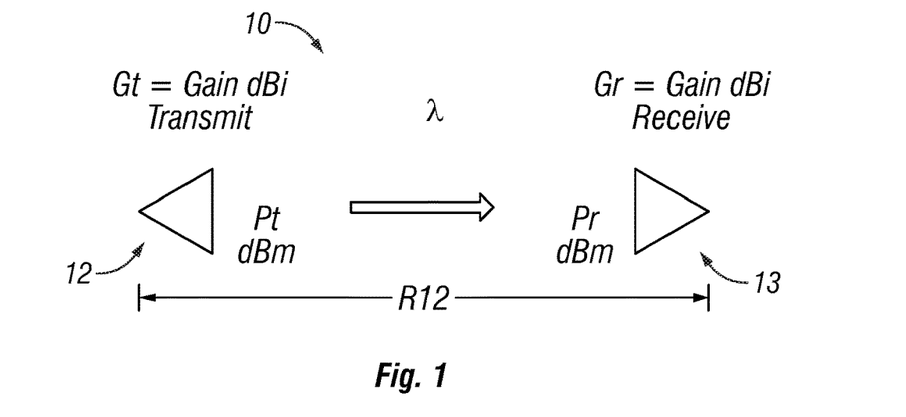
FIG. 1 is a block diagram of a passive repeater showing the Link, Friis equation in dB according to the invention.

FIG. 1 is a block diagram of a passive repeater showing the Link, Friis equation in dB according to the invention. In embodiments of the invention, the passive repeater 10 comprises two back-to-back antennas, i.e. a first antenna in a first region 12 and a second antenna in a second region 13, that are configured to expand illumination coverage.

The following is the Link, Friis equation in dB as applied to embodiments of the invention (with reference to FIG. 1):

Direct, R12, Region 1 to Region 2

$$Pr=Pt+Gt+Gr+20 \text{ Log}(\lambda/(4\pi R12))\text{dBm}$$

where Pr, Pt=power in dBm and Gt, Gr=gain in dB.

Figure 2:
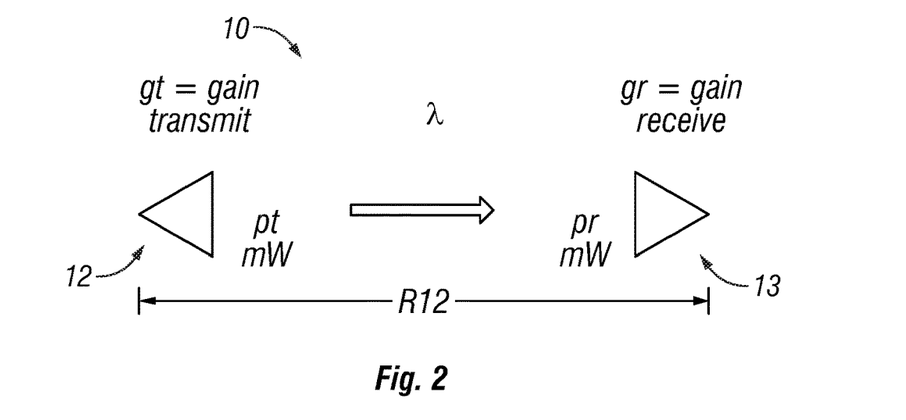
FIG. 2 is a block diagram of a passive repeater showing the Link, Friis equation for power in mW according to the invention.

FIG. 2 is a block diagram of a passive repeater showing the Link, Friis equation for power in mW according to the invention. In embodiments of the invention, the passive repeater 10 comprises two back-to-back antennas, i.e. a first antenna in a first region 12 and a second antenna in a second region 13, that are configured to expand illumination coverage.

The following is the Link, Friis equation for power in mW as applied to embodiments of the invention (with reference to FIG. 1):

Direct Ant1 to Ant2, R12, Region 1 to Region 2

$$pr=pt \times gt \times gr \times (\lambda/(4\pi R12))^2 \text{ mW}$$

where Pr, Pt=power in mW and Gt, Gr=gain, nominally 1.0.

Figure 3:
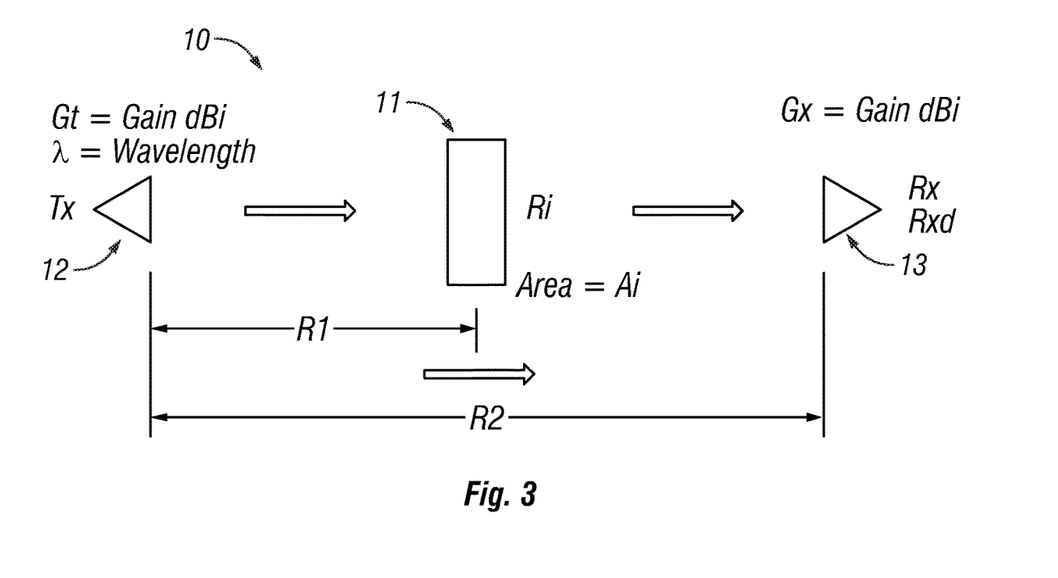
FIG. 3 is a block diagram of a passive repeater showing an exemplary mathematical system model according to the invention.

FIG. 3 is a block diagram of a passive repeater according to the invention. In embodiments of the invention, the passive repeater 10 comprises two back-to-back antenna arrays, i.e. a first antenna in a first region 12 and a second antenna in a second region 13, that are configured to expand illumination coverage. The antenna is driven by a window or aperture 11 which allows energy in one region to pass to another.

The following is an exemplary mathematical system model (with reference to FIG. 3):

$$\text{Direct } Rxd=Tx+Gt+Gx+20 \text{ Log}(\lambda/(4\pi R2))$$

$$R1Ri=Tx+Gt+10 \text{ Log}(Ai/(4\pi(R1\char`\^2)))$$

$$R2-R1Rx=Ri+Gx+10 \text{ Log}(Ai/(4\pi((R2-R1)\char`\^2)))$$

Signal radiating from a transmitter Tx, expressed in dBm, is received by the aperture Ri which has an area Ai. In embodiments of the invention the area Ai is a holographic plate or a Fresnel lens.

The received power at the aperture Ri=the field strength times the area Ai. By reciprocity, the received signal Rx can be determined based on Ai and the spreading factor for the distance R2−R1 with the gain Rx. The direct path comes from the above Link or Friis equation.

Embodiments of the invention are provided for Wi-Fi applications. Those skilled in the art will appreciate that embodiments of the invention are equally applicable to any other transceiver system.

The basic principle to be employed in the invention is the Huygens principle. As stated:

"Each point on a primary wave front is a source of secondary spherical waves or wavelets. From this a secondary wave front can be constructed as the surface envelope of these secondary waves."

The approach in embodiments of the invention is to replace the points with an antenna system that can retransmit the received signal with a complex (Real, Imaginary) weighted transmitted signal. The complex weighting is achieved by controlling the antenna element density in the aperture and the phase delay through each sub-element, where the phase delay imparts a directional component to the outgoing signal.

In a transmission mode (discussed below), the phase delay only need vary over 360° in small steps, such as 45°, i.e. eight discrete steps 45°, 90°, 135°, 180°, 225°, 270°, 315°, and 360°. The resulting elements hence provide for a thin layer similar to a Fresnel Lens.

In a reflection mode (discussed below), the phase delay only need vary over 180° in small steps, e.g. 22.5°, i.e. eight discrete steps, to the terminal reflection point 22.5°, 45°, 67.5°, 90°, 112.5°, 135°, 157.5°, and 180°. The resulting elements hence provide for a thin layer similar to a Fresnel Zone Plate. If the phase is the same for all elements the result is a flat mirror, Using different phases can form a reflective diverging or converging lens or other such conformal mapping.

Figure 4A:
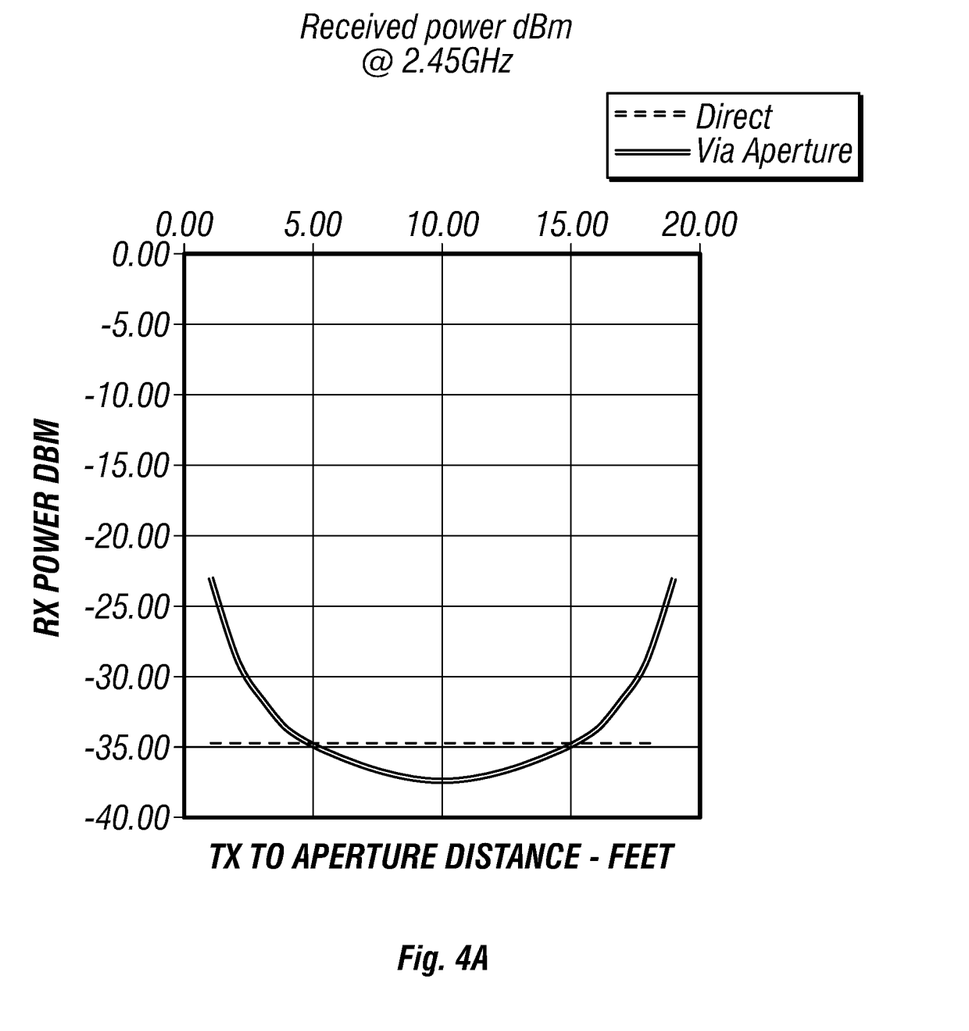
FIGS. 4A and 4B are graphs that show received power over Wi-Fi in the 2G band (FIG. 4A) and 5G band (FIG. 4B) according to the invention.
Figure 4B:
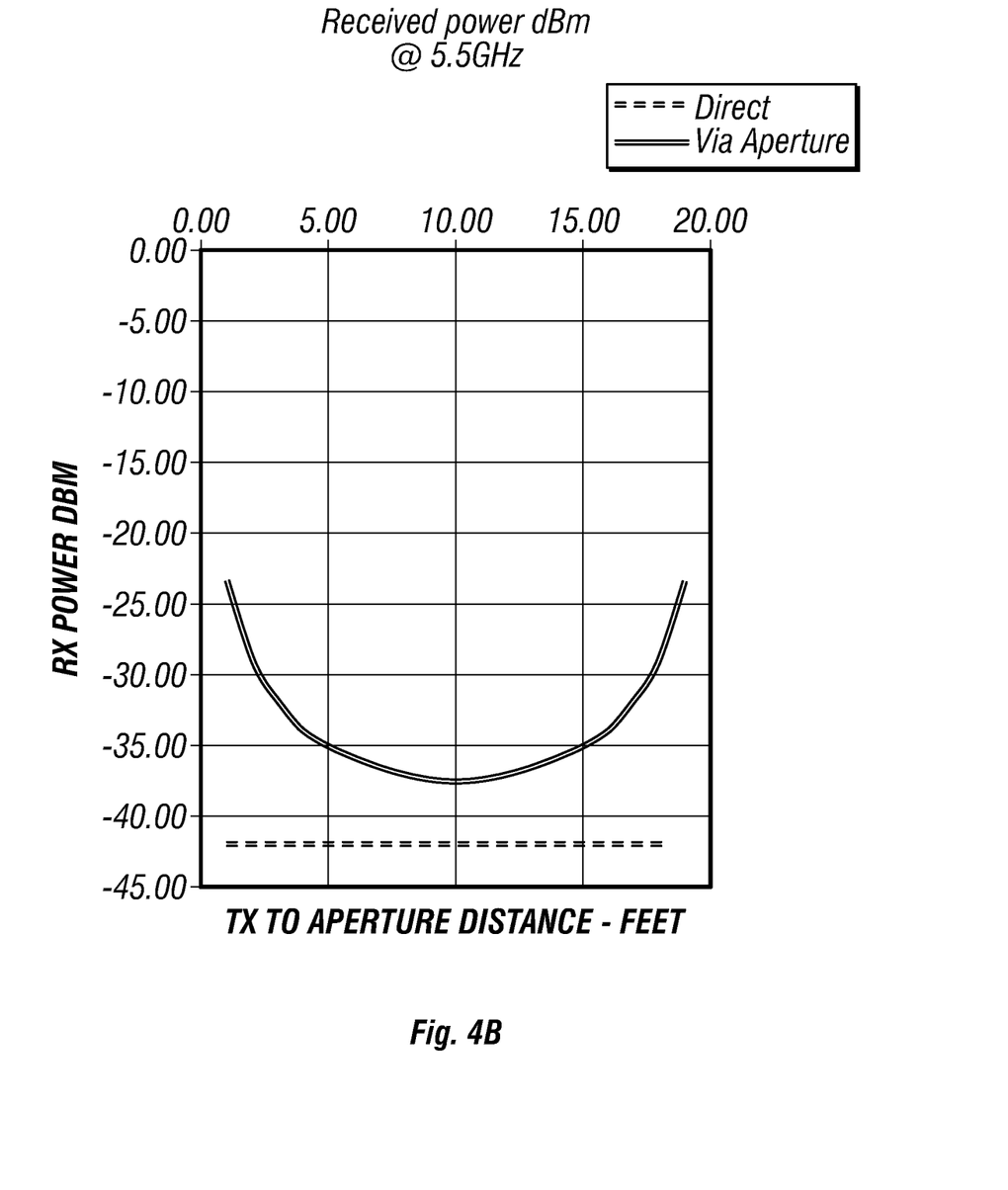

FIGS. 4A and 4B are graphs that show calculations of received power over Wi-Fi in the 2G band (FIG. 4A) and 5G band (FIG. 4B) according to the invention. In FIGS. 2A and 2B the aperture is placed between endpoints which occur at 0.00 feet and 20.00 feet. An AP or router is situated at each endpoint. The aperture can be moved closer to an AP or router, for example from 10.00 feet to 5.00 feet; or from 10.00 feet to 15.00 feet. The results show that the best aperture performance is achieved when the aperture is closer to the AP or the router, i.e. nearer to the endpoints, e.g. at 2.00 feet or 18.00 feet. The direct path and the path via the aperture are equal at the 25% point for the 2G band. At the midpoint, performance of the aperture is worst.

One alternative is to place the aperture close to the AP or the router. Improvement beyond this requires an active system, which would require bidirectional RF amplifiers, a non-Foster circuit, or a negative resistance circuit in the antenna system elements. This would defeat the purpose of a passive system, but could be used as an external adjunct to the passive system.

Aperture

The aperture is a passive system that effects a focus between an access point and a router (see FIG. 3). Embodiments of the aperture are provided as a flat panel. However, those skilled in the art will appreciate that the aperture may have any of a bent surface having one or more bends, a curved surface, or an assembly of bent and/or curved surfaces.

Embodiments of the herein disclosed antenna system operate in any of a transmission or reflection mode.

Figure 5A:
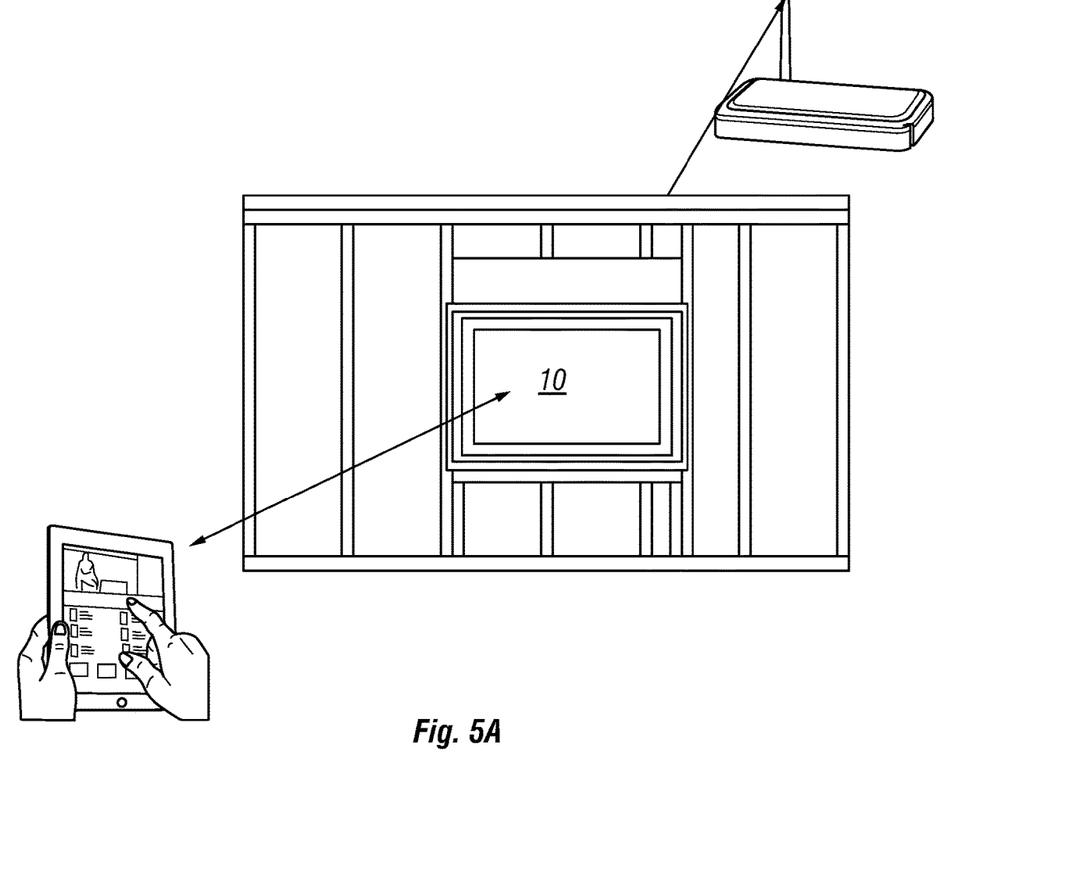
FIGS. 5A and 5B show an aperture system for operation in a transmission mod (FIG. 5A) and in a reflective mode (FIG. 5B) according to the invention.

In the transmission mode (see FIG. 5A), the antenna system 10 receives the signal on one side of the aperture and transmits it out the other side thereof.

The transmit power cannot exceed the received power. Rather, the power is focused.

Figure 5B:
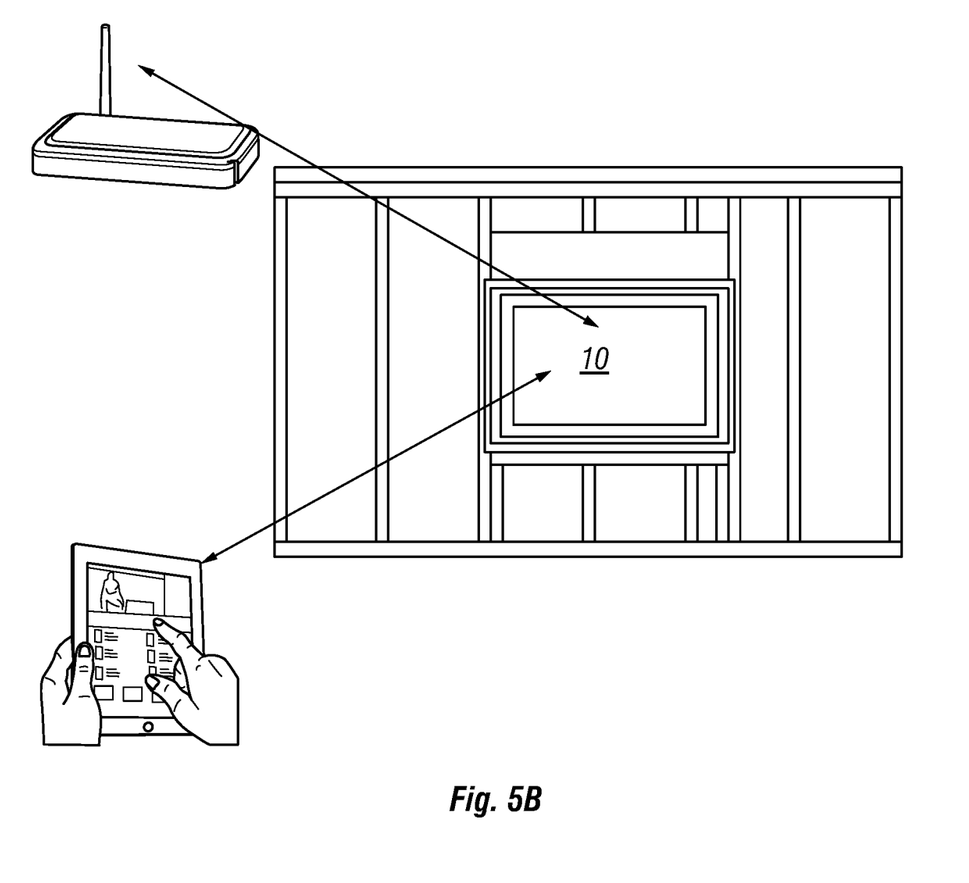

In the reflection mode (see FIG. 5B), the antenna system 10 reflects all of the received power back from the aperture. This also provides an RF barrier on the other side of the aperture.

The aperture achieves a conformal mapping between two regions as determined by the complex coupling by the individual antenna elements. Embodiments of the invention can also cascade multiple apertures, including combinations of transmission and reflection modes as, and if, desired.

For simplicity, the discussion herein begins with flat apertures. These apertures may employ any of the following: dielectric lenses, stepped dielectric lenses, discrete metal shape scattering lenses, Fresnel lenses, holographic lenses, and discrete multiple antenna element lenses.

The aperture may be transmissive or reflective and may support multiple bands.

Figure 6:
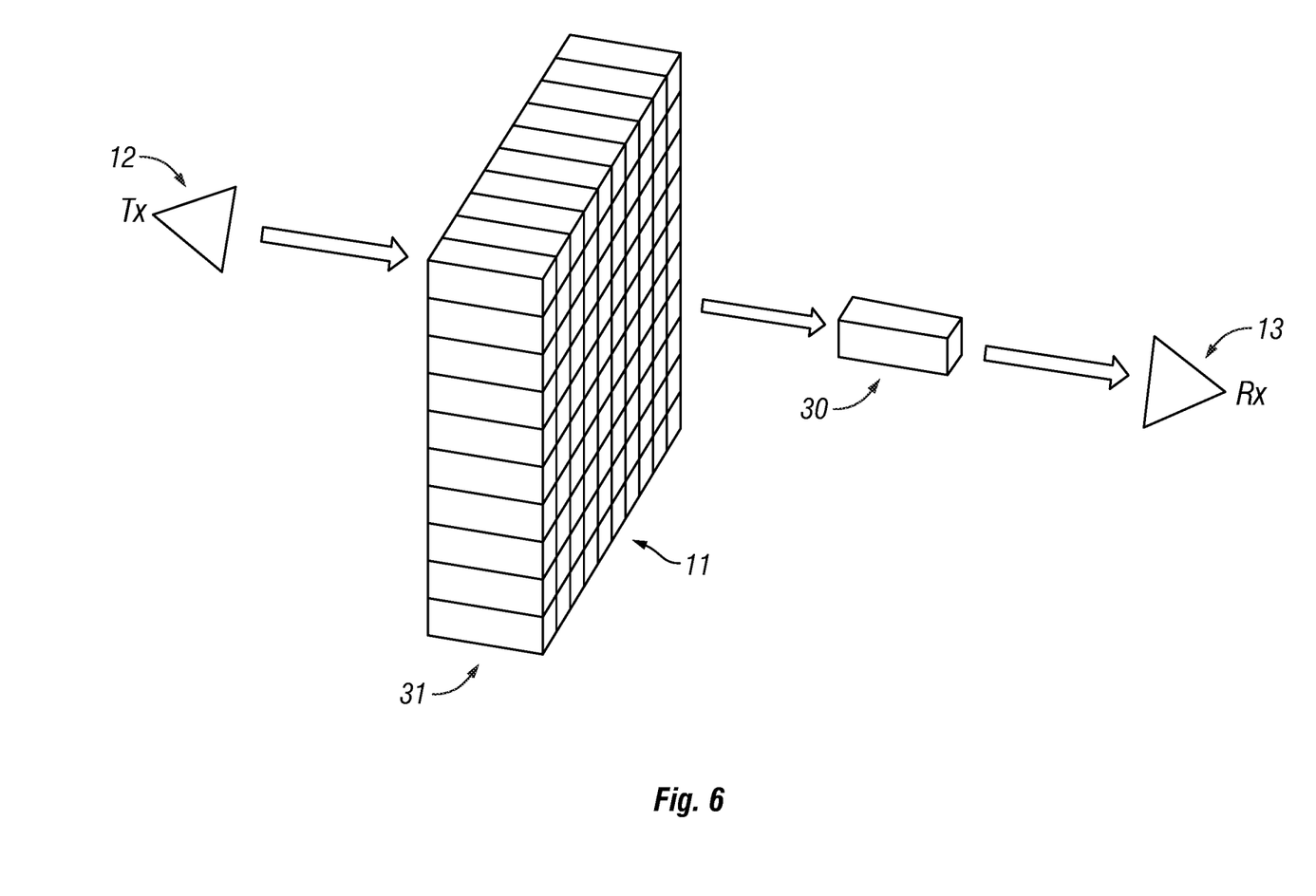
FIG. 6 illustrates an aperture transmission mode aperture for a passive repeater with a rectangular antenna element according to the invention.

FIG. 6 illustrates an aperture transmission mode for a passive repeater with a rectangular antenna element according to the invention. In FIG. 6, the aperture 11 having a depth 31 is shown within a path from a transmitter Tx in a first region 12 and a receiver Rx in a second region 13. In embodiments of the invention, the aperture comprises an array of elements 30 which, in FIG. 6 is a 10×10 array. Those skilled in the art will appreciate that the array of elements in the aperture may comprise any number of rows and columns.

Each element comprises two directional antennas connected by a transmission line. The transmission line is adjusted in length to select the required phase delay for the element, which thus effectively point the antenna. In embodiments of the invention the phase delay may be adjusted to direct the signal path, as well as narrow or broaden the signal path. For example, for a broader signal path the phase delay of the antenna elements at the edges of the array may be adjusted to create a signal path that diverges from a center line through an axis of the aperture, i.e. a broadening signal path; for a directional signal path, the phase delay of all antenna elements may be adjusted in a similar manner, i.e. they are all pointed in the same direction. Those skilled in the art will appreciate that any number of variations in phase delay can be applied to one or more of the antenna elements to shape the output of the aperture as desired.

Thus, the phase of each transmission line is chosen to form a given lens system. The number of elements used defines the resulting focus, beam pattern or gain. Thus, a focus can be realized in the same way as is done for a flat zoned lens using discrete elements. The herein disclosed antenna system is essentially a planar beam former.

Figure 7:
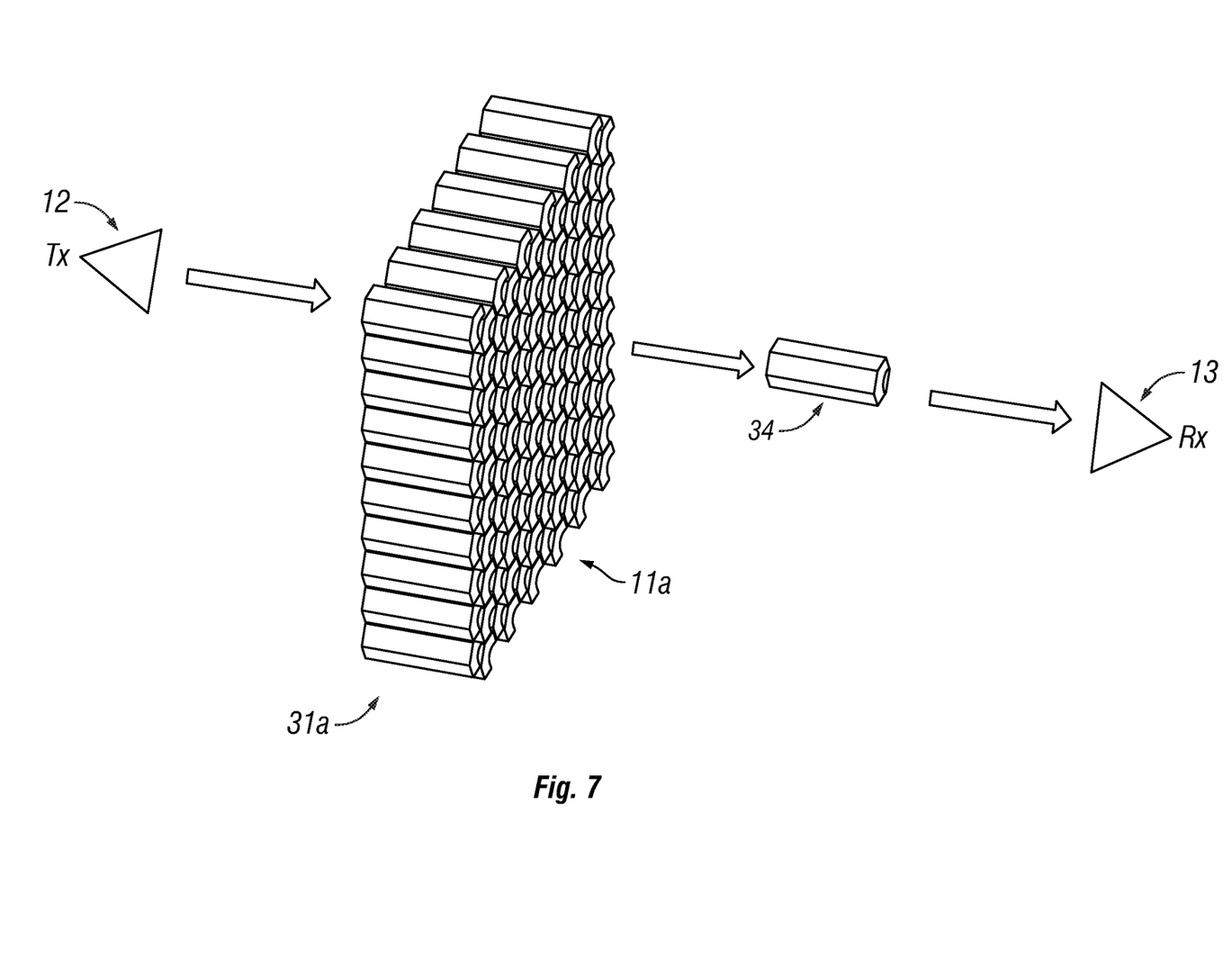
FIG. 7 illustrates an aperture transmission mode for a passive repeater with a hexagonal antenna element according to the invention.

FIG. 7 illustrates an aperture transmission mode for a passive repeater with a hexagonal antenna element according to the invention. In FIG. 7, the aperture 11a having a depth 31a is shown within a path from a transmitter Tx in a first region 12 and a receiver Rx in a second region 13. In embodiments of the invention, the aperture comprises an array of elements 34 which, in FIG. 6 is a 10×10 array. Those skilled in the art will appreciate that the array of elements in the aperture may comprise any number of rows and columns.

Operation of this embodiment of the invention is similar to that discussed above in connection with FIG. 6. The use of hexagonal antenna elements vs. the rectangular antenna elements of FIG. 6 is a matter of choice. Typically most antennas are rectangular; other options include hexagonal, circular, etc.

Figure 8A:
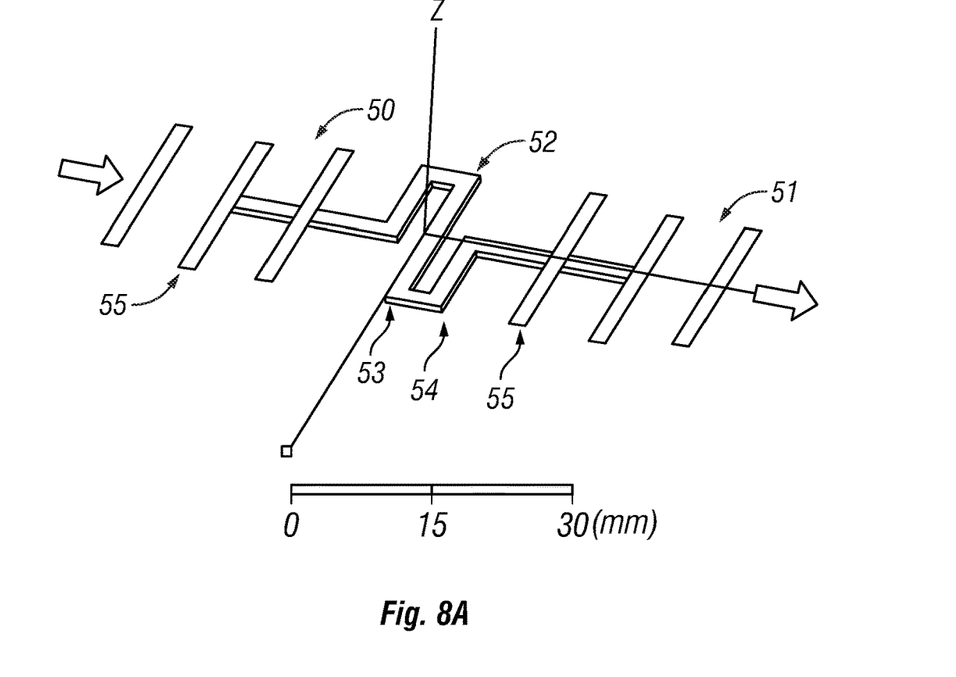
FIGS. 8A and 8B show an aperture element for a passive repeater according to the invention.
Figure 8B:
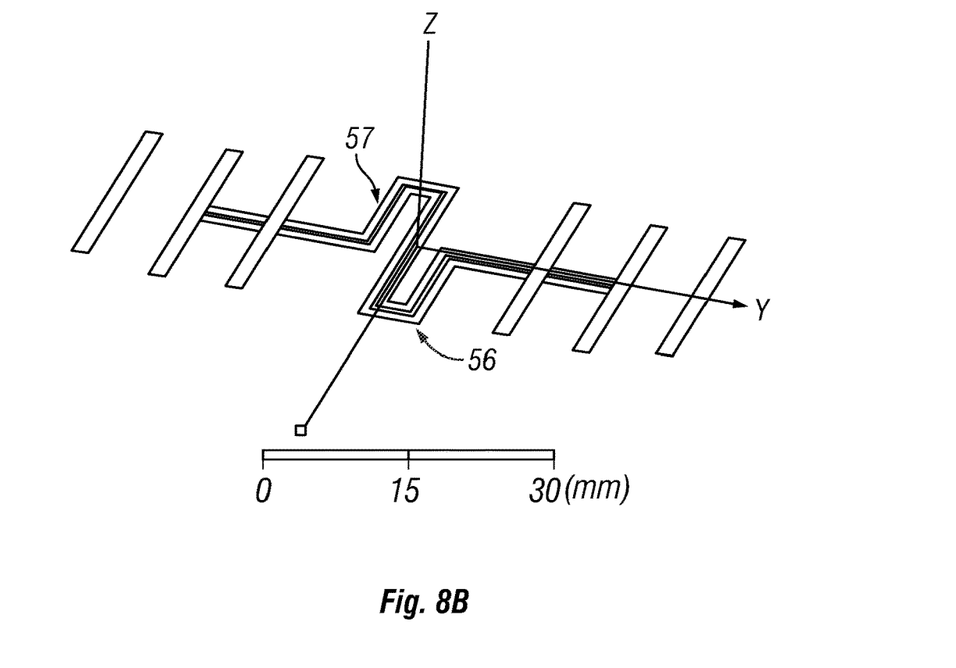

FIGS. 8A and 8B show an aperture element for a passive repeater according to the invention and, in particular, an aperture element transmission mode three-element Yagi antenna.

As shown in in FIGS. 8A and 8B, the two antennas 50, 51 used are three-element Yagis, each having a driven element and a reflector 55. These antennas exhibit an excellent front-to-back ratio. The antennas are connected by a transmission line pair 57, not twisted. The phase is adjusted for a given element by adjusting the trombone length 52 and phase is shifted by a phase shifter 53. FIG. 8A shows the aperture with an impedance control cover 54 in place; FIG. 8B shows the aperture with an impedance control cover 56 removed.

Figure 9:
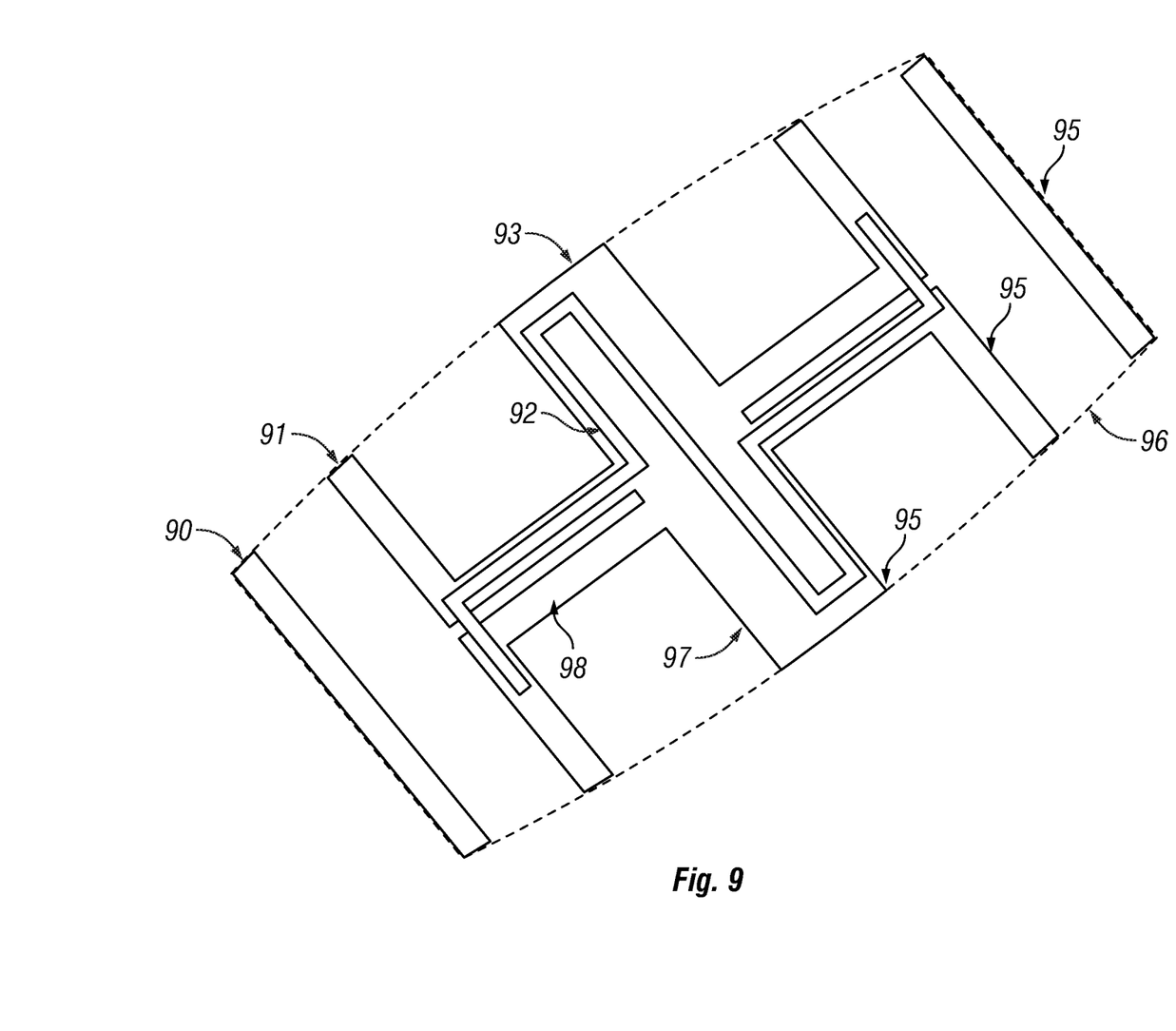
FIG. 9 shows a sub element detail according to the invention.

One characteristic of these antennas is that they have an excellent front-to-back ratio. The antennas are connected by a transmission line pair, not twisted. The phase is adjusted for a given element by adjusting the trombone length. Cross polarization is achieved using a second aperture element rotated by 90°, if required FIG. 9 shows a sub-element detail according to the invention. The sub-element describes the antenna element structure. The aperture comprises an array of such sub-elements. Each sub-element comprises two directional antennas that are connected by a transmission line. The transmission line is adjusted in length to select the required phase delay for the element. The elements shown are, in embodiments of the invention, rectangular or hexagonal and are uniformly distributed. Non-uniform distribution is also permitted to achieve amplitude weighting as or if required. This can also be achieved by withdrawal of elements from the array of elements in the aperture to effect the same result in a uniform array.

The phase of each transmission line is chosen to form a given lens system. The more elements used defines the resulting focus and beam pattern, Thus, a focus can be realized in the same way as is done for a Flat Zoned Lens using discrete elements. This new system is essentially a planar beam former In FIG. 9, a first three-element Yagi comprises a director 90, dipole 91, and a reflector 92 that is shared with a second three-element Yagi 95. The Yagi also comprises a balun 98.

The antenna element in this embodiment is formed on a PCB 96 (shown in outline) and comprises a copper bottom trace 97 and a copper top trace 92. In some embodiments, a PCB material may be inserted between the top and bottom traces.

Figure 10:
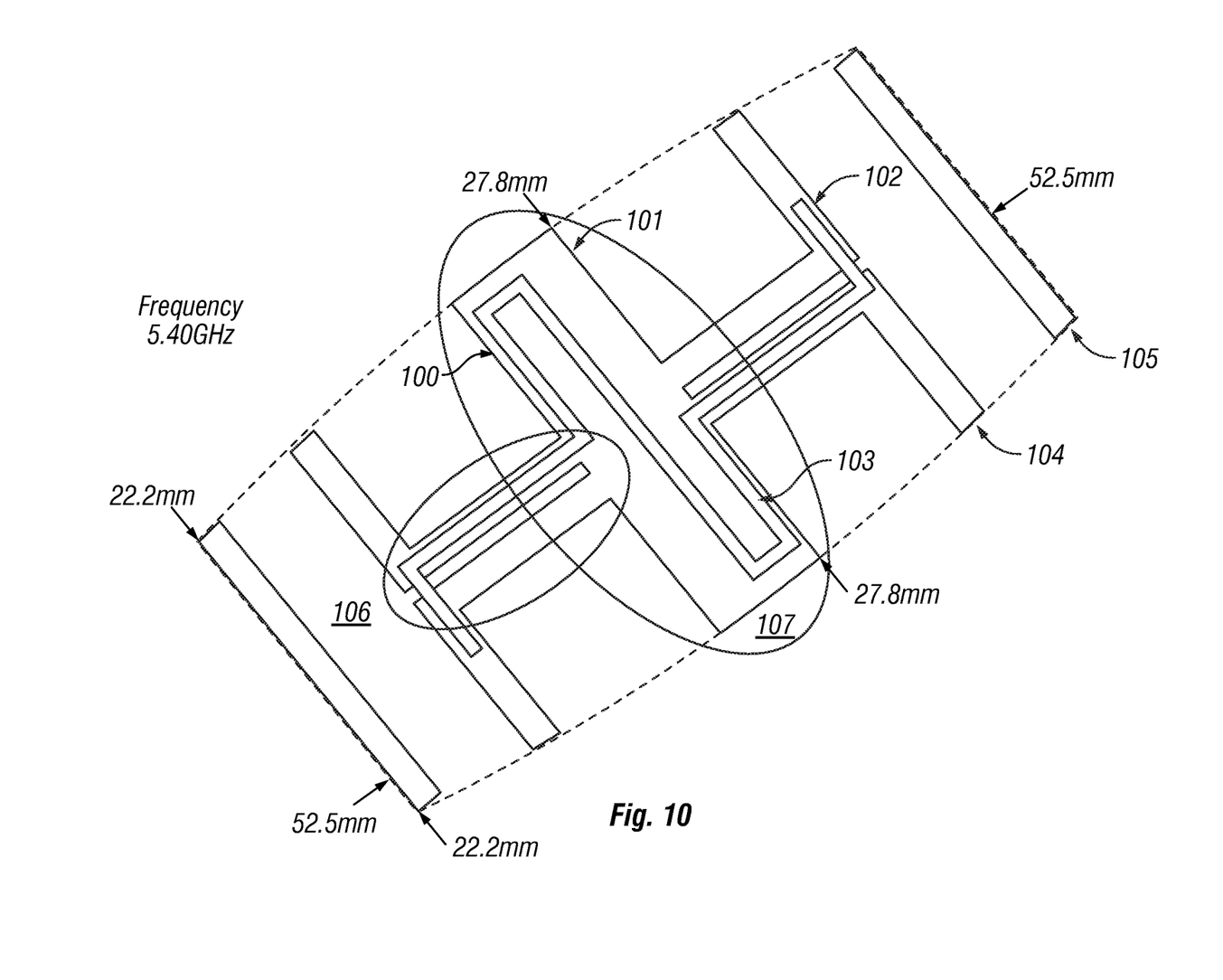
FIG. 10 shows a further sub element detail according to the invention.

FIG. 10 shows a further sub-element detail according to the invention. In FIG. 10, the sub-element comprises two three-element Yagis, each of which comprises, for example in connection with the right most Yagi, a director 105, dipole 104, and a shared reflector having a first reflector edge 101 and a second reflector edge 100. A match 102 and balun 106 are provided. A phase shifter 107 is implemented with a trace 103. In FIG. 10, dimensions for the various components of the antenna sub-elements are provided for the 5.4 GHz band. Those skilled in the art will appreciate that other dimensions can be chosen as appropriate for a desired frequency of operation.

Figure 11:
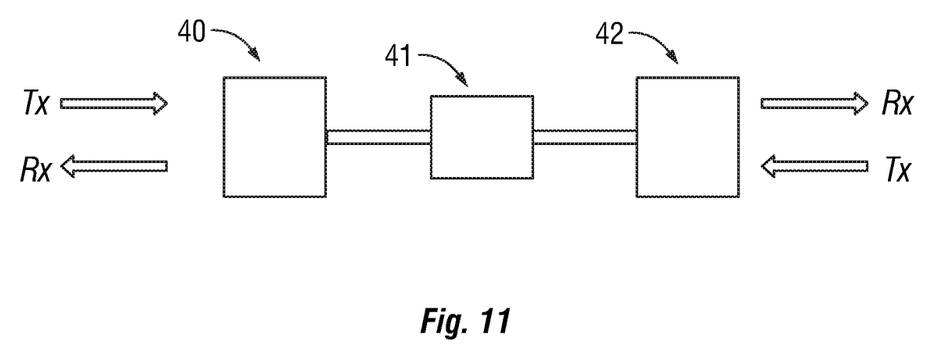
FIG. 11 is a block diagram showing an aperture element transmission mode in a passive repeater according to the invention.

FIG. 11 is a block diagram showing an aperture element transmission mode in a passive repeater according to the invention. The directional antennas 40, 42 provide a front-to-back ratio disposed to isolate the antennas from each other and allow bidirectional phase shifted paths. This conforms with the law of reciprocity. In embodiments of the invention, the directional antennas provide a back-to-front ratio of at least 15 dB and as much as 25 dB, thus achieving an isolation of 30 dB to 50 dB. Examples of antenna that can be adapted to this antenna system include, for example, a Yagi three-element antenna, a log periodic antenna, horn, and patch antennas. The Yagi and log periodic antennas are connected by a balanced transmission line 41 and may also be crossed for dual polarization. The horn antenna should be connected using a wave guide and also provides for dual polarization.

Figure 12:
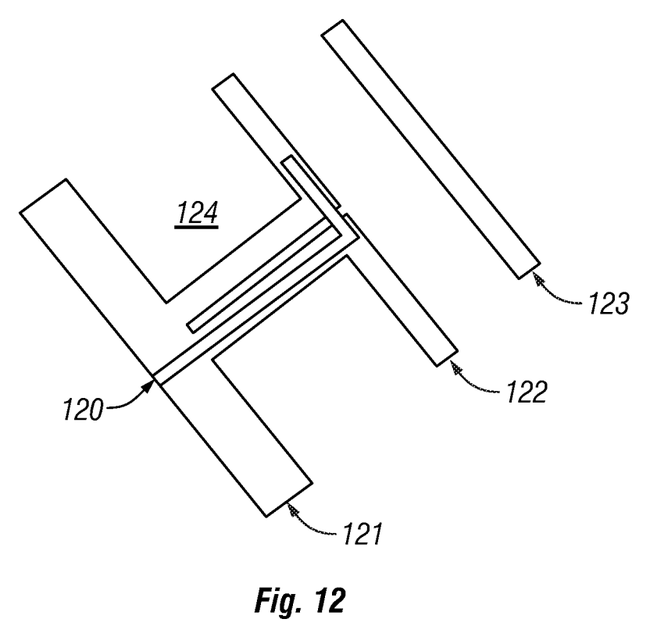
FIG. 12 shows a uni-directional antenna comprising a Yagi three-element antenna according to the invention.

FIG. 12 shows a uni-directional antenna comprising a Yagi three-element antenna according to the invention. As noted, the invention is readily applied to many different antenna configurations, including but not limited to, Yagi antennas, log periodic antennas, patch antennas, and horn antennas. The three element Yagi antenna shown in FIG. 12 comprises a reflector 121, dipole 122, and director 123. Loading to the RF feed 120 is established by a balun 124.

Figure 13A:
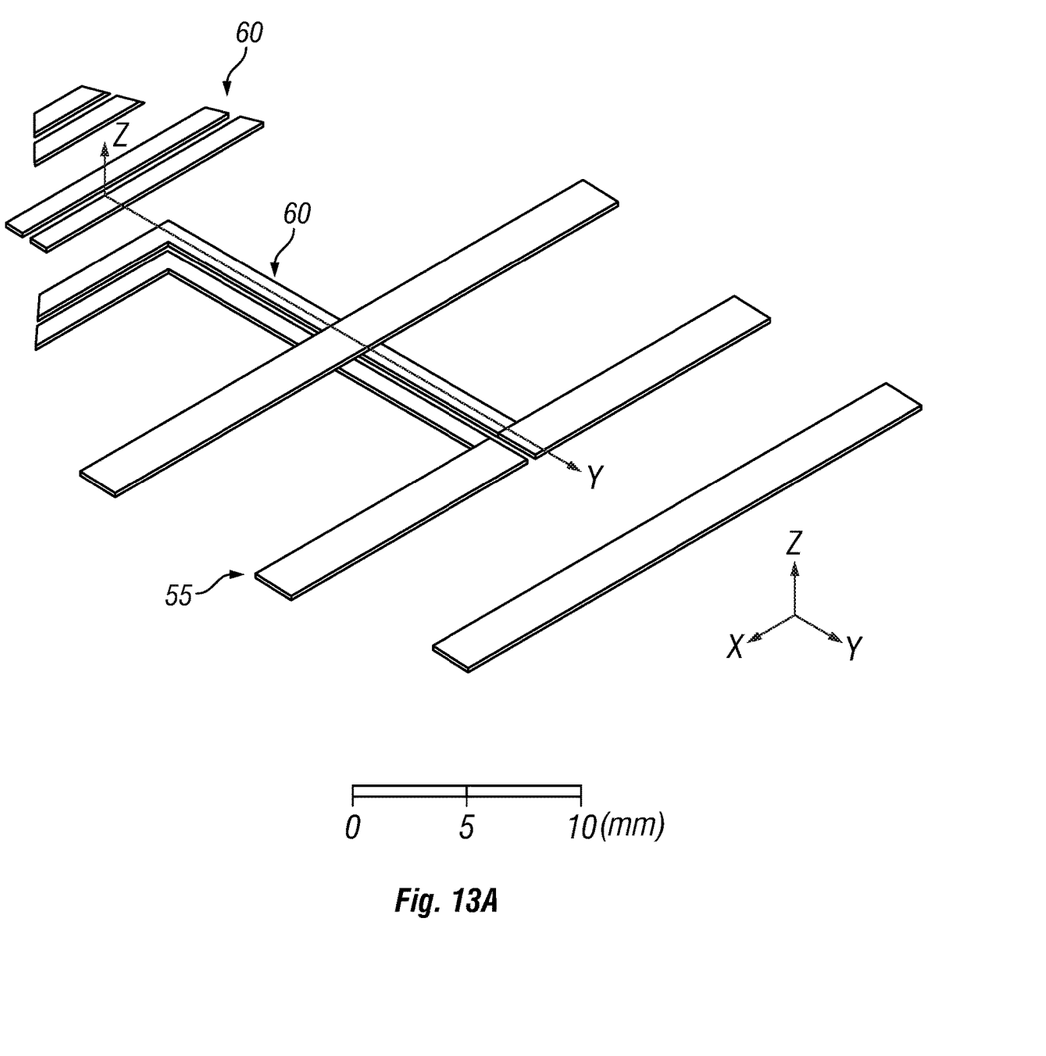
FIGS. 13A and 13B show a driven element feed reversal technique in an aperture element transmission mode according to the invention.
Figure 13B:
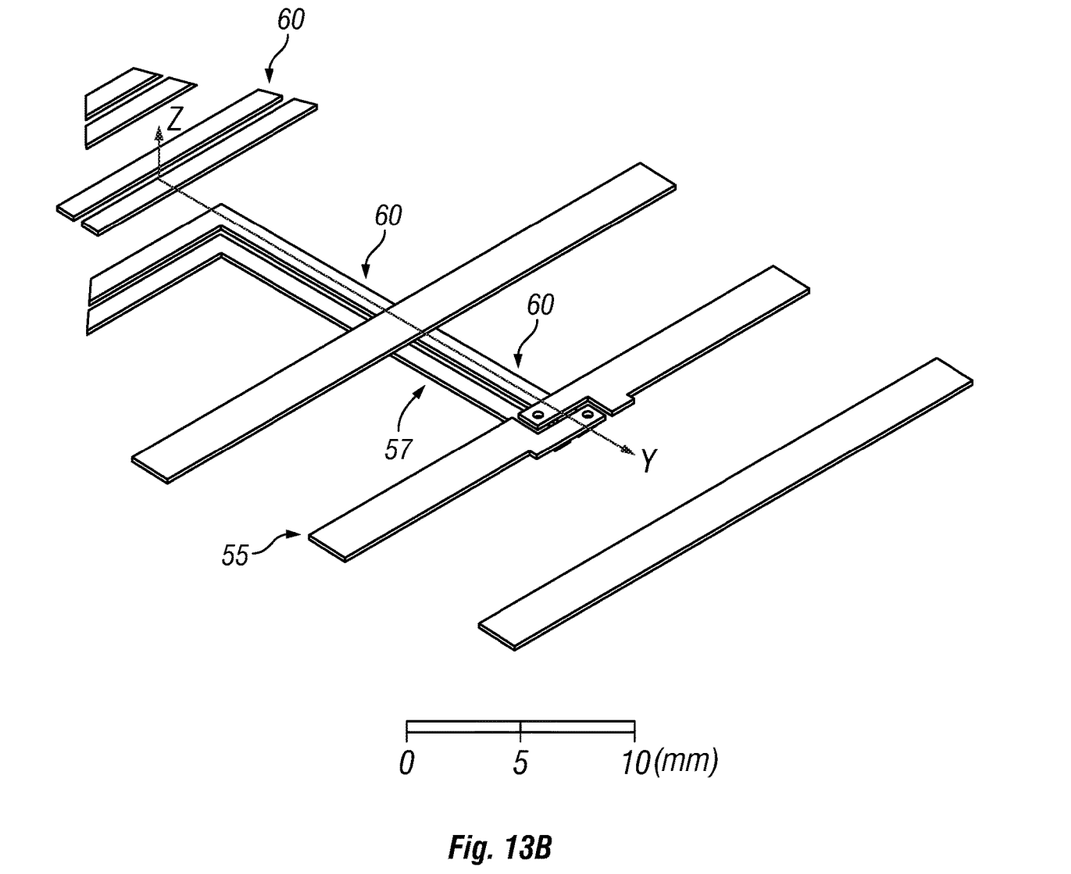

FIGS. 13A and 13B show a driven element feed reversal technique, inversion or 180 degree in an aperture element transmission mode according to the invention. In FIGS. 13A and 13B, a balanced transmission line 60 is connected to the driven element 55. The Impedance cover plate has been removed. Note that the transmission line 60 passes under the reflector element 57.

FIG. 13B shows the mechanism used to reverse the polarity of the driven element. This allows for a phase shift of 180°. Using this phase shift permits the trombone to be half the width required without it. Note that the inverted element is now on the top as distinct from the non-inverted element. Those skilled in the art will appreciate that a simple log periodic antenna may replace the Yagi. Other types of antennas may also substitute these including circularly polarized types.

Figure 14:
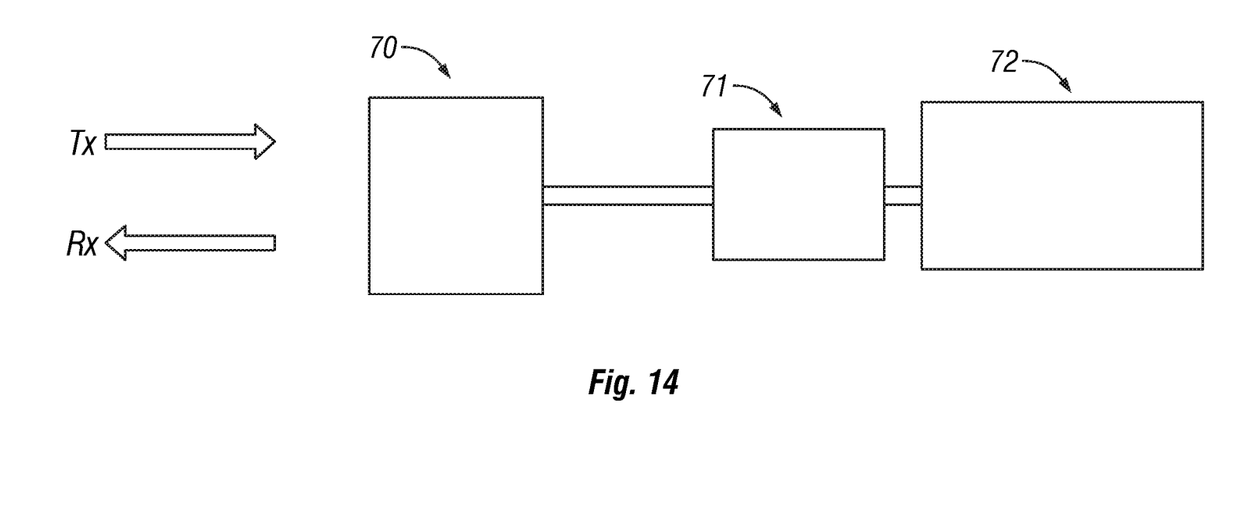
FIG. 14 is a block diagram showing an aperture element reflection mode in a passive repeater according to the invention.

FIG. 14 is a block diagram showing an aperture element reflection mode in a passive repeater according to the invention. The aperture according to this embodiment of the invention includes a directional antenna 70 and a transmission line 71 connected to a lossless termination 72. In the reflection mode, all of the received energy is substantially reflected back with a phase shift and thus becomes the transmitted energy. Accordingly, a reflective lens is achieved by using suitable transmission line phase shifts in the aperture array.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A transmissive passive repeater, comprising: two or more antenna arrays, each antenna array having an associated region; and an aperture defined by said antenna arrays, wherein energy at respective antenna arrays passes between each of said associated regions; each of said antenna arrays further comprising a Yagi three-element antenna; wherein each said three-element Yagi antennas comprises: at least one driven reflector; wherein said three-element Yagi antennas are connected by a transmission line pair, not twisted; wherein phase is adjusted for a given element by adjusting a trombone length; and wherein phase is shifted by a phase shifter.

2. The transmissive passive repeater of claim 1, further comprising: two or more antenna arrays, each antenna array having an associated region; and said aperture defined by said antenna arrays, said aperture comprising a passive system that effects a focus between an access point and a router; wherein energy at respective antenna arrays passes between each of said associated regions.

3. The repeater of claim 1, said antenna arrays further comprising:

two directional antennas having a front-to-back ratio that isolates the antennas from each other and allows bidirectional phase shifted paths.

4. The repeater of claim 1, further comprising:

said aperture defining an energy transfer path in accordance with the following:

Direct $Rxd=Tx+Gt\ Gx+20\ Log(\lambda/(4\pi R2))$ $R1Ri=Tx\ Gt+10\ Log(Ai/(4\pi(R1^2))$ $R2-R1Rx=Ri+Gx+10\ Log(Ai/(4\pi((R2-R1)^2)))$ wherein a signal radiating from Tx, expressed in dBm, is received by the aperture Ri which has an area Ai;

wherein received power at the aperture Ri=field strength times the area Ai;

wherein a received signal Rx is determined based on Ai and a spreading factor for the distance R2-R1 with a gain Rx; and wherein R1 is a distance along a transmission path from a transmitter to the aperture and R2 is a distance along the transmission path from the transmitter to a receiver.

5. The repeater of claim 1, wherein energy is received and transmitted over Wi-Fi in any of the 2G band and 5G band.

6. The repeater of claim 1, further comprising:

a cascade of multiple apertures.

7. The repeater of claim 1, wherein said aperture replaces points with an antenna system that retransmits a received signal with a complex weighted transmitted signal;

wherein complex weighting is achieved by controlling antenna element density in the aperture and phase delay through each antenna element.

8. The repeater of claim 1, wherein phase delay varies by 360° in steps of about 45°.

9. The repeater of claim 1, said aperture further comprising:

an array of elements, each element comprising two directional antennas connected by a transmission line, wherein said transmission line is adjusted in length to select a required phase delay for each element.

10. The repeater of claim 9, wherein the phase of each transmission line is chosen to form a given lens system.

11. The repeater of claim 9, wherein the number of elements used defines a resulting focus and beam pattern.

12. The repeater of claim 1, wherein said Yagi three-element antennas are connected by a balanced transmission line that is optionally configured to be crossed for dual polarization.

13. The repeater of claim 1, further comprising:

a second aperture element that is rotated by 90° to provide cross polarization.

14. The repeater of claim 1, further comprising:

a mechanism for reversing polarity of the driven element to provide a phase shift of 180°.

* * * * *